(12) United States Patent
Lenihan et al.

(10) Patent No.: US 12,423,037 B2
(45) Date of Patent: Sep. 23, 2025

(54) OPTIMAL PRINTING OF TEMPLATE COMPONENTS ON A FABRIC SUBSTRATE

(71) Applicant: Resonance Companies LLC, New York, NY (US)

(72) Inventors: Lawrence Lenihan, New York, NY (US); Kiegan Lenihan, New York, NY (US); Christian Gheorghe, New York, NY (US); Robert Hall, New York, NY (US); Saoirse Amarteifio, New York, NY (US)

(73) Assignee: RESONANCE COMPANIES LLC, New York, NY (US)

( * ) Notice: Subject to any disclaimer, the term of this patent is extended or adjusted under 35 U.S.C. 154(b) by 197 days.

(21) Appl. No.: 18/143,022

(22) Filed: May 3, 2023

(65) Prior Publication Data

US 2024/0365901 A1 Nov. 7, 2024

(51) Int. Cl.
*G06F 3/12* (2006.01)
*A41H 3/00* (2006.01)
(Continued)

(52) U.S. Cl.
CPC .......... *G06F 3/1252* (2013.01); *A41H 3/007* (2013.01); *B41J 3/4078* (2013.01); *G06F 3/1219* (2013.01); *G06F 3/1262* (2013.01); *H04N 1/2323* (2013.01); *H04N 1/2384* (2013.01); *H04N 1/32133* (2013.01); *H04N 1/32635* (2013.01); *H04N 1/32667* (2013.01); *G06F 3/1288* (2013.01); *H04N 2201/3225* (2013.01); *H04N 2201/3271* (2013.01)

(58) Field of Classification Search
CPC ..... A41H 3/007; B41J 3/4078; H04N 1/2323; H04N 1/2384; H04N 1/32133; H04N 1/32635; H04N 1/32667; H04N 2201/3225; H04N 2201/3271; G06F 3/1219; G06F 3/1288; G06F 3/1252; G06F 3/1262; G06F 3/125
See application file for complete search history.

(56) References Cited

U.S. PATENT DOCUMENTS 6,173,211 B1 * 1/2001 Williams ................. A41H 3/08
700/131
9,107,462 B1 * 8/2015 Heinrich ................ A41H 3/007
(Continued)

*Primary Examiner* — Nicholas Pachol
(74) *Attorney, Agent, or Firm* — CRGO Global; Steven M. Greenberg

(57) ABSTRACT

Optimal template component printing includes reading from a pool, a set of printable pieces, each corresponding to a pattern for a respective garment, and each having known dimensions. A starting point is located on a section of a fabric substrate onto which the pieces are to be printed. Different piece combinations are then computed for different subsets of the pieces in the set for which a sum of the known dimensions of the pieces of the subset is less than or equal to a constraining dimension of the fabric substrate as measured from the starting point. A combination is selected which minimizes a difference between the constraining dimension and the sum and a printer is directed to print the pieces of the selected combination onto the fabric substrate. Finally, the pieces of the selected combination are removed from the pool and the process repeats for remaining pieces in the pool.

15 Claims, 3 Drawing Sheets

(51) Int. Cl.
    *B41J 3/407*     (2006.01)
    *H04N 1/23*     (2006.01)
    *H04N 1/32*     (2006.01)

(56) References Cited

U.S. PATENT DOCUMENTS

| | | | |
|---|---|---|---|
| 10,185,525 B1 * | 1/2019 | Hossepian | G06F 3/1211 |
| 2012/0307294 A1 * | 12/2012 | Matsuda | G06F 3/1219 |
| | | | 358/1.15 |
| 2015/0217553 A1 * | 8/2015 | Bowser | B41J 3/4078 |
| | | | 156/277 |
| 2015/0379385 A1 * | 12/2015 | Fukata | G06F 3/1235 |
| | | | 358/1.14 |
| 2017/0001455 A1 * | 1/2017 | Murakami | B41J 11/008 |
| 2017/0131954 A1 * | 5/2017 | Lagares-Greenblatt | |
| | | | G06F 3/1262 |
| 2018/0113657 A1 * | 4/2018 | Takahashi | G06F 3/1215 |
| 2020/0050157 A1 * | 2/2020 | Marino | G06F 16/1734 |
| 2020/0094579 A1 * | 3/2020 | Dziesietnik | G06F 3/1285 |
| 2022/0413466 A1 * | 12/2022 | Ingling | D06P 7/00 |

* cited by examiner

OPTIMAL PRINTING OF TEMPLATE COMPONENTS ON A FABRIC SUBSTRATE

BACKGROUND OF THE INVENTION

Field of the Invention

The present invention relates to the technical field of garment template printing and more particularly to the optimal arrangement of patterns of a template defined for the production of a garment.

Description of the Related Art

In sewing and fashion design, a pattern is the template with which the parts of a garment are produced by placing the template upon fabric, tracing the perimeter of the template onto the fabric, cutting the traced portions of the fabric and assembling the cut portions of fabric into a garment. Patterns typically are formed from paper, and sometimes more rigid materials such as paperboard or cardboard so as to support repeated use. The process of making or cutting patterns is known as "patternmaking" and traditionally performed by a patternmaker who typically employs one of two methods to create a pattern. The first method is known as the flat-pattern method in which the entire pattern is drafted on a flat surface from measurements, using rulers, curves and straight-edges. The second method is known as drawing which involves creating a muslin mock-up pattern by pinning fabric directly on a form, and subsequently transferring the muslin outline and markings onto a paper pattern or using the muslin as the pattern itself.

The advent of computing has revolutionized patternmaking. Today, different computer applications facilitate the job of creating patterns by allowing the pattern maker to provide as data input to the application different measurements from which a pattern is generated computationally within a data processing system. Most applications additionally allow the pattern maker to fit individual measurements specifically, eliminating much fitting trial and error previously common in the sewing room. Indeed, the computational power of computing greatly eases the way in which garments are designed so as to more readily support not only mass-produced articles of clothing, but also custom, individually tailored garments known as "bespoke" articles.

Pattern utilization obviously lends itself well to the mass production of garments such that a discrete number of patterns are able to support the production of a wide range of different sizes of the same article of clothing. But, pattern utilization also works well in made-to-measure and bespoke garment fabrication. For made-to-measure garment fabrication, the pre-existing pattern is used to cut the relevant fabric which is then adjusted for the specific size of the customer, whereas in bespoke garment fabrication, a completely new pattern is created according to the measurements of the customer. In the latter circumstance, creating the pattern can be a manually intensive and thus time-consuming process.

Importantly, the old world manner of pattern utilization necessarily requires the intermediate presence of a the cardboard pattern which can then be placed upon a roll of fabric of particular print so that the fabric can then be cut into a section which ultimately is assembled with other sections through sewing into a garment. The new world manner of pattern utilization, though, provides for the printing of the pattern directly onto a fabric substrate. Indeed, with the capability and speed of modern ink jet printers, the underlying print can be applied to the fabric substrate in the shape of the pattern so that a set of printed patterns on the fabric need only be cut from the fabric to produce the set of printed patterns to be assembled into a garment.

In an architecture where only a single template of patterns is to be printed, the process is straightforward enough—load a template into memory of a computer, rasterize the template and direct the printer to print the rasterized form of the template onto a portion of a roll of fabric substrate. However, serially loading each different template for each individual garment can be highly inefficient resulting in a process of scheduling in which many different instances of the same templated garment are printed at once followed by a next set of instances of a different templated garment. Obviously, it would be much more efficient to simply print an instance of a templated garment on demand as required.

Yet, in doing so, much of the costly fabric substrate will be wasted owing to the portion of the fabric not consumed when printing the template. Further, to the extent that a printing mistake occurs, the same instance of the templated pattern must be reloaded and reprinted once the error has been recognized by an operator of the printer. Of course, in doing so, additional waste of fabric will have occurred.

BRIEF SUMMARY OF THE INVENTION

Embodiments of the present invention address technical deficiencies of the art in respect to template printing of patterns of a garment onto a fabric substrate from which the printed patterns may be extracted and assembled into the garment. To that end, embodiments of the present invention provide for a novel and non-obvious method for the optimal printing of template components on a fabric substrate. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In accordance with an invention disclosed herein, a process of the optimal printing of template components onto a fabric substrate includes reading, from a pool of printable pieces, a set of the printable pieces, each having a corresponding one of a multiplicity of different patterns for respectively different garments, and with each of the printable pieces having known dimensions such as length and width. The method additionally includes locating, on a section of a fabric substrate, a starting point from which different ones of the pieces in the set are to be printed and the computing, for each different one of a multiplicity of subsets of the pieces in the set, different combinations of the pieces for which a sum of the known dimensions for the pieces of a corresponding one of the combinations is less than or equal to a constraining dimension of the fabric substrate measured from the starting point. The method yet further includes selecting one of the different combinations which minimizes a difference between the constraining dimension of the fabric substrate and the sum. Finally, the method includes directing a printer to print the pieces of the selected one of the different combinations onto the fabric substrate, removing the pieces of the selected one of the different combinations from the pool and the repeating of the reading, locating, computing, selecting, directing and removing for remaining ones of the printable pieces of the patterns.

The foregoing embodiment includes several different aspects including the following aspects:

The derivation of the set of printable pieces from multiple different patterns, each including a defined arrangement of selected ones of the pieces which when combined form a different one of the garments.

The additional direction of the printer to print a marker at an edge of each one of the pieces of the selected one of the different combinations, the marker identifying a corresponding one the different garments.

The additional detection of a printing error in respect to printing of one of the pieces and in response to the detection, the re-insertion of the one of the pieces associated with the printing error into the pool.

The selection of the one of the different combinations which minimizes the difference between the constraining dimension of the fabric substrate and the sum includes either:

The filtering of the set to pieces associated with a threshold customer priority or a filtering of the set to pieces to include only ones of the pieces in the set having a length within a common range of lengths, so that the selection of the one of the different combinations occurs from amongst the pieces of the filtered set.

In another embodiment of the invention disclosed herein, a data processing system is adapted for optimally printing template components on a fabric substrate. The system includes a host computing platform with one or more computers, each with memory and one or processing units including one or more processing cores. The system also includes a template printer coupled to the host computing platform and loaded with a roll of fabric substrate of fixed width and length. The system yet further includes a template print optimization module which in turn includes computer program instructions enabled while executing in the memory of at least one of the processing units of the host computing platform to optimally print template components on a fabric substrate.

In this regard, the computer program instructions are enabled to read from a pool of printable pieces, a set of the printable pieces. Each of the pieces in the set has a corresponding pattern from amongst a multiplicity of different patterns for respectively different garments. As well, each of the pieces in the set has known dimensions. The program instructions are further enabled to locate on a section of a fabric substrate, a starting point from which different ones of the pieces in the set are to be printed and to compute, for each different one of a multiplicity of subsets of the pieces in the set, different combinations of the pieces for which a sum of the known dimensions for the pieces of a corresponding one of the combinations is less than or equal to a constraining dimension of the fabric substrate measured from the starting point. The computer program instructions yet further are enabled to select one of the different combinations which minimizes a difference between the constraining dimension of the fabric substrate and the sum and to direct a printer to print the pieces of the selected one of the different combinations onto the fabric substrate. Finally, the program instructions are enabled to remove the pieces of the selected one of the different combinations from the pool and to repeat the reading, locating, computing, selecting, directing and removing for remaining ones of the printable pieces of the patterns.

In this way, the technical deficiencies of the serialized templated pattern printing directly onto fabric substrate are overcome owing to the queued heterogeneous set of pattern elements for printing according to a dynamic arrangement optimizing utilization of the full surface area of the fabric substrate, and the automated error handling of misprinted portions of the pattern elements.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for optimally printing template components on a fabric substrate. In accordance with an embodiment of the invention, a set of different patterns from different templates resident in a printing queue are selected for printing onto a fabric substrate. Thereafter, the printing dimensions of different permutated combinations of the different patterns in the set are computed. Then, a subset of the patterns in one of the permutated combinations is selected for printing which has the combined printing dimensions of length and width that is closest to but not exceeding the constraining printing dimensions of length, width or both of a portion of a roll of loaded fabric substrate. Thereafter, absent an error condition in printing, the patterns of the subset are removed from the queue. However, in the event an error condition is detected to have occurred with respect to a corresponding one of the patterns in the subset, the corresponding one of the patterns remains in the queue so that the corresponding one of the patterns may be reprinted at a later time.

Figure 1:
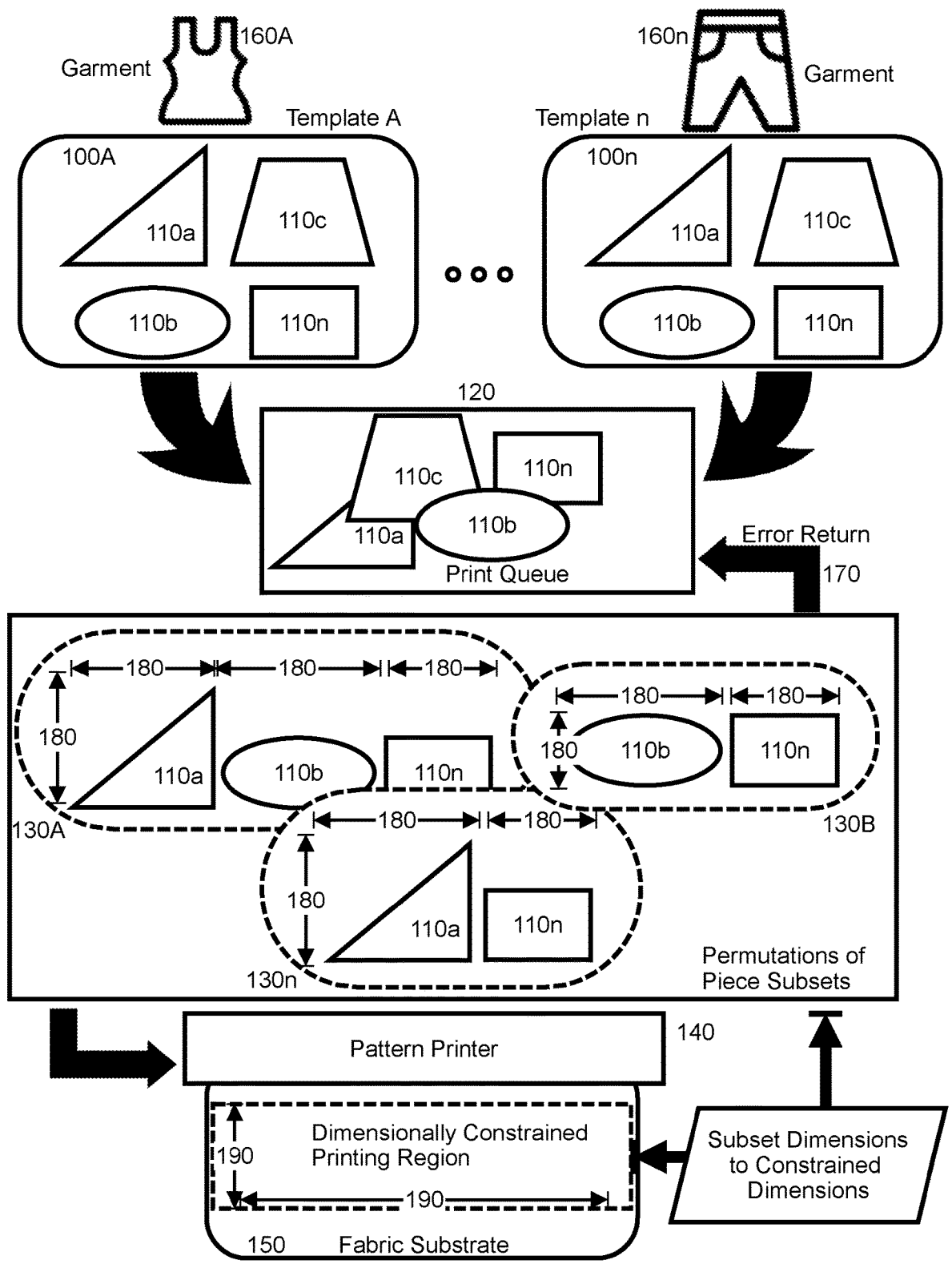
FIG. 1 is a pictorial illustration reflecting different aspects of a process of optimally printing template components on a fabric substrate.

In illustration of one aspect of the embodiment, FIG. 1 pictorially shows a process of optimally printing template components on a fabric substrate. As shown in FIG. 1, different pieces 110*a*, 110*b*, 110*c*, 110*n* of a pattern for a template 100A, 100N for corresponding garments 160A, 160*n* are inserted into a print queue 120 for printing onto a fabric substrate 150 by a pattern printer 140. Continuously, sets of the pieces 110*a*, 110*b*, 110*c*, 110*n* are pulled from the print queue 120 and different permutations 130A, 130B, 130*n* are generated, each of the permutations 130A, 130B, 130*n* including a combination of one or more of the pieces 110*a*, 110*b*, 110*c*, 110*n*. Each of the permutations 130A, 130B, 130*n* includes a spatial arrangement of the included pieces 110A, 110b, 110c, 110n such that dimensional metrics 180 can be computed for each of the permutations 130A, 130B, 130n—namely a width and length of the corresponding one of the permutations 130A, 130B, 130n.

Each of the dimensional metrics 180 for corresponding ones of the permutations 130A, 130B, 130n are then compared to the dimensions 190 of a dimensionally constrained printing region of the fabric substrate set forth at a printing starting point on the fabric substrate 150. One of the permutations 130A, 130B, 130n is then selected for printing by the printer 140 having the dimensional metrics 180 closest to, but not exceeding the dimensions 190 of the dimensionally constrained printing region of the fabric substrate 150. As such, those of the pieces 110a, 110b, 110c, 110n included in the selected one of the permutations 130A, 130B, 130n are removed from the print queue 120.

However, the printed set of the pieces 110a, 110b, 110c, 110n can be monitored for printing errors, such as faded ink, or imperfect impression upon the fabric substrate 150. In the event that one of the pieces 110a, 110b, 110c, 110n in the selected one of the permutations 130A, 130B, 130n is associated with a printing error, the one of the pieces 110a, 110b, 110c, 110n is subject to an error return 170 to the print queue 120 for subsequent print queuing. In any event, once the pieces 110a, 110b, 110c, 110n of the selected one of the permutations 130A, 130B, 130n has been successfully printed onto the fabric substrate 150, the process repeats for a next set of the pieces 110a, 110b, 110c, 110n in the print queue 120.

Figure 2:
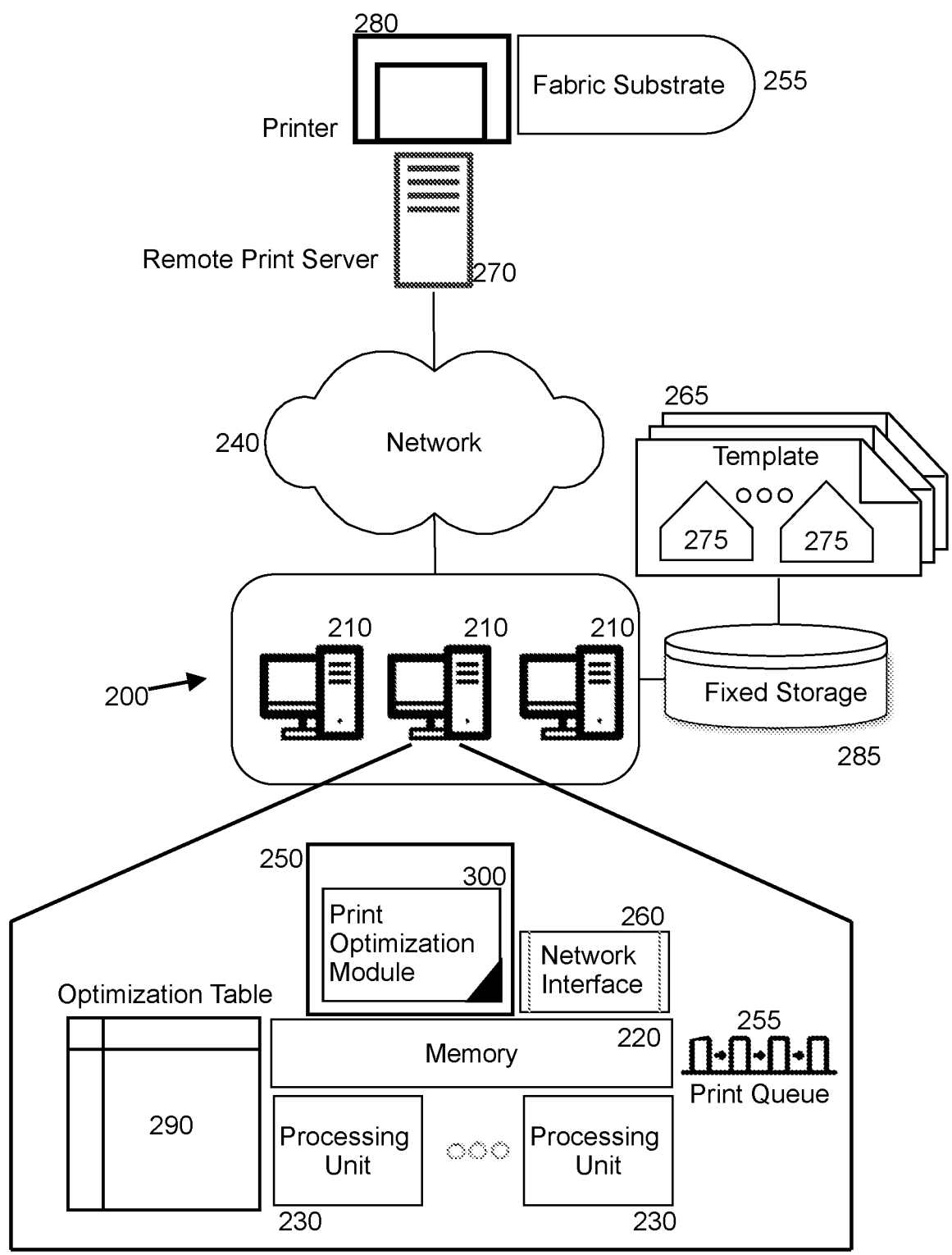
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform optimal printing of template components on a fabric substrate. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240. In this regard, the host computing platform 200 is coupled over data communications network remote print server 270 managing one or more fabric printers 280 adapted to print different pieces 275 of a garment template 265 stored in fixed storage 285 onto rolls of a fabric substrate 255.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for optimally printing template components on a fabric substrate. Specifically, the program instructions during execution retrieve a set of pieces 275 for respective ones of the templates 265 placed in a print queue 255 for printing by the printer 280. The program instructions then generate different permutations of the pieces 275 to produce different unique subsets of one or more of the pieces 275.

The program instructions compute for a two-dimensional arrangement of each of the subsets of the pieces 275, different dimensions, such as a composite length and width for the entirety of the pieces 275 in the subset. For each one of the subsets amongst the permutations, the dimensions are compared to the constraining dimensions of a portion of the fabric substrate 255, measured from a starting print position of a printable area of the fabric substrate 255. The difference between measurements for each of the subsets are written to an optimization table 290 and one of the subsets with a minimized difference to the constraining dimensions is then selected for printing on the fabric substrate 255. To that end, the program instructions transmit a print directive over the data communications network 240 to the remote print server to print the arrangement of the pieces 275 of the one of the subsets selected in the optimization table 290. Those pieces of the one of the subsets are then removed from the print queue 255 and the program instructions repeat the process for a next set of the pieces 275 in the print queue 255.

Figure 3:
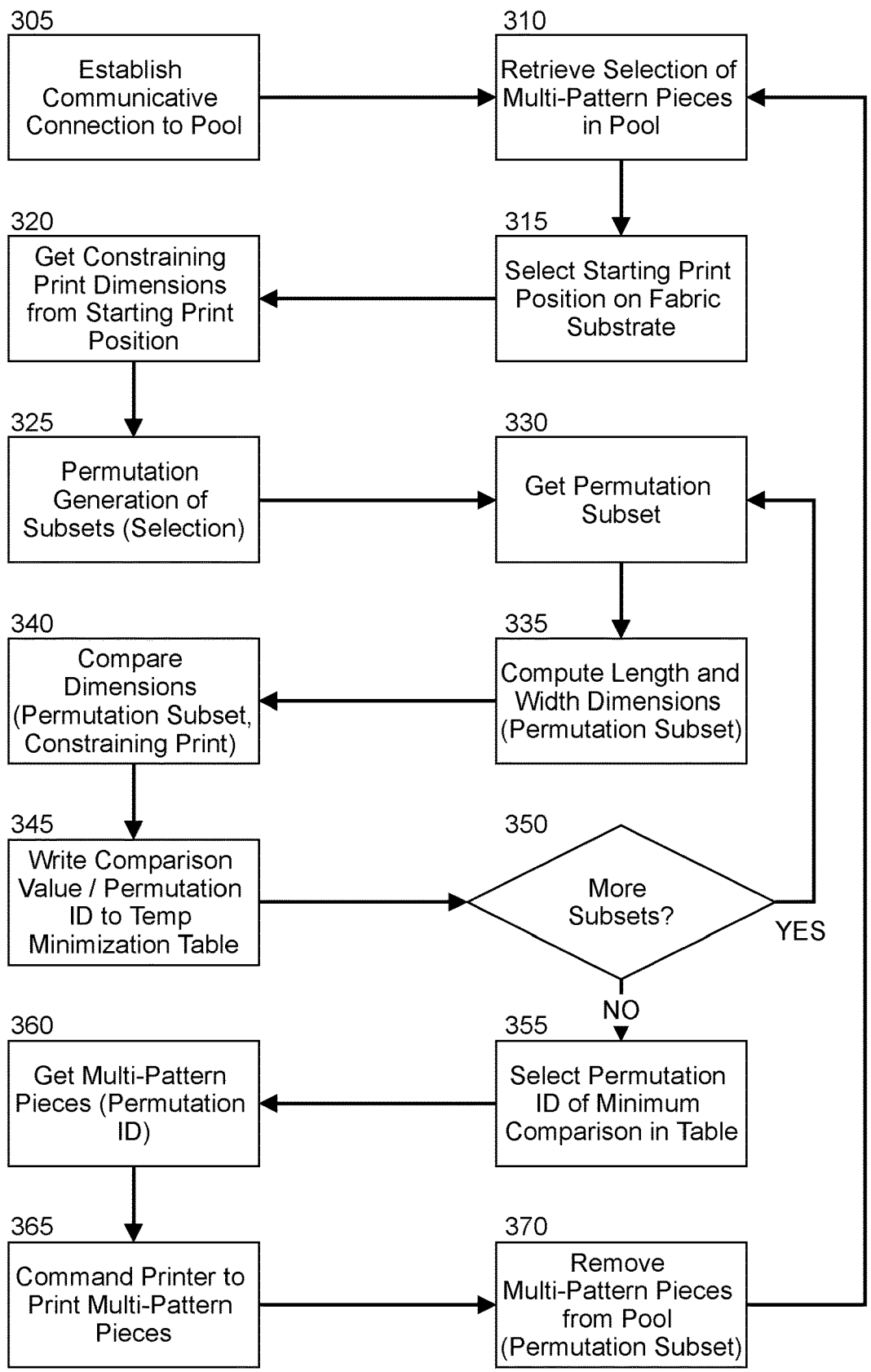

In further illustration of an exemplary operation of the module, FIG. 3 is a flow chart illustrating one of the aspects of the process of FIG. 1. Beginning in block 305, a communicative connection is established to a pool of pieces queued for printing onto a fabric substrate. In block 310, different pieces associated with one or more different garment templates are selected for optimized printing. In block 315, a starting printer position is determined for printing on the fabric substrate. The starting printer position, for instance, can be a horizontal position after which a yet to be printed upon, printable area of the fabric is available for printing. Thereafter, in block 320, constraining print dimensions are determined from the starting position, such as the length and width of a bounding box defining the printable area of the fabric substrate.

In block 325, different permutations of combinations of the different pieces selected from the pool are generated ranging from individual ones of the pieces to multiple two-dimensionally arranged collections of the pieces. In block 330, a first one of the permutations is selected for processing and in block 335, the length and width dimensions of the first one of the permutations is determined—namely the composite width of the arrangement of the pieces in the first one of the permutations, and the composite length of the arrangement of the pieces in the first one of the permutations. In block 340, then, the determined dimensions of the first one of the permutations is compared to the constraining print dimensions and the different is written in connection with the first one of the permutations in block 345 to an optimization table.

In decision block 350, it is determined if additional ones of the permutations has yet to be processed. If so, the process returns to block 330 with the selection of a next one of the permutations. Once again, in block 335 the length and width dimensions of the next one of the permutations is determined—namely the composite width of the arrangement of the pieces in the next one of the permutations, and the composite length of the arrangement of the pieces in the next one of the permutations. In block 340, then, the determined dimensions of the next one of the permutations is compared to the constraining print dimensions and the different is written in connection with the next one of the permutations in block 345 to the optimization table. The process repeats for each remaining one of the permutations in the subset.

In decision block 350, when no further permutations remain to be considered in the subset, in block 355, the optimization table is processed to identify one of the permutations associated with a minimal dimensional difference relative to the constraining print dimensions. In block 360, the pieces of the identified one of the permutations is then retrieved from the pool and in block 365 a print directive is transmitted to the printer to print the pieces of the identified one of the permutations onto the fabric substrate at the starting position. Finally, at bloc 370 the pieces of the identified one of the permutations are removed from queuing in the pool and the process returns to block 310 with the selection in the pool of additional different pieces associated with one or more different garment templates for optimized printing.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for optimally printing template components on a fabric substrate comprising:
   reading from a pool of printable pieces a set of the printable pieces each having a corresponding one of a multiplicity of different patterns for respectively different garments, each of the printable pieces having known dimensions;
   locating on a section of a fabric substrate a starting point from which different ones of the pieces in the set are to be printed;
   computing for each different one of a multiplicity of subsets of the pieces in the set, different combinations of the pieces for which a sum of the known dimensions for the pieces of a corresponding one of the combinations is less than or equal to a constraining dimension of the fabric substrate measured from the starting point;
   selecting one of the different combinations which minimizes a difference between the constraining dimension of the fabric substrate and the sum;
   directing a printer to print the pieces of the selected one of the different combinations onto the fabric substrate;
   removing the pieces of the selected one of the different combinations from the pool;
   repeating the reading, locating, computing, selecting, directing and removing for remaining ones of the printable pieces of the patterns;
   thereafter detecting a printing error in respect to printing of one of the pieces; and,
   responsive to the detection, re-inserting the one of the pieces associated with the printing error into the pool for use in a new permutation of the printable pieces at a later time.

2. The method of claim 1, wherein the set of printable pieces derives from multiple different patterns, each including a defined arrangement of selected ones of the pieces which when combined form a different one of the garments.

3. The method of claim 2, further comprising directing the printer to print at an edge of each one of the pieces of the selected one of the different combinations, a marker identifying a corresponding one the different garments.

4. The method of claim 1, wherein the selection of the one of the different combinations which minimizes the difference between the constraining dimension of the fabric substrate and the sum comprises filtering the set to pieces associated with a threshold customer priority and performing the selection of the one of the different combinations from amongst the pieces of the filtered set.

5. The method of claim 1, wherein the selection of the one of the different combinations which minimizes the difference between the constraining dimension of the fabric substrate and the sum comprises filtering the set to pieces to include only ones of the pieces in the set having a length within a common range of lengths and performing the selection of the one of the different combinations from amongst the pieces of the filtered set.

6. A data processing system adapted for optimally printing template components on a fabric substrate, the system comprising:
   a host computing platform comprising one or more computers, each with memory and one or processing units including one or more processing cores;
   a template printer coupled to the host computing platform and loaded with a roll of fabric substrate of fixed width and length; and,
   a template print optimization module comprising computer program instructions enabled while executing in the memory of at least one of the processing units of the host computing platform to perform:
   reading from a pool of printable pieces a set of the printable pieces each having a corresponding one of a multiplicity of different patterns for respectively different garments, each of the printable pieces having known dimensions;
   locating on a section of a fabric substrate a starting point from which different ones of the pieces in the set are to be printed;
   computing for each different one of a multiplicity of subsets of the pieces in the set, different combinations of the pieces for which a sum of the known dimensions for the pieces of a corresponding one of the combinations is less than or equal to a constraining dimension of the fabric substrate measured from the starting point;
   selecting one of the different combinations which minimizes a difference between the constraining dimension of the fabric substrate and the sum;
   directing a printer to print the pieces of the selected one of the different combinations onto the fabric substrate;
   removing the pieces of the selected one of the different combinations from the pool;
   repeating the reading, locating, computing, selecting, directing and removing for remaining ones of the printable pieces of the patterns;
   thereafter detecting a printing error in respect to printing of one of the pieces; and,
   responsive to the detection, re-inserting the one of the pieces associated with the printing error into the pool for use in a new permutation of the printable pieces at a later time.

7. The system of claim 6, wherein the set of printable pieces derives from multiple different patterns, each including a defined arrangement of selected ones of the pieces which when combined form a different one of the garments.

8. The system of claim 7, wherein the program instructions further direct the printer to print at an edge of each one of the pieces of the selected one of the different combinations, a marker identifying a corresponding one the different garments.

9. The system of claim 6, wherein the selection of the one of the different combinations which minimizes the difference between the constraining dimension of the fabric substrate and the sum comprises filtering the set to pieces associated with a threshold customer priority and performing the selection of the one of the different combinations from amongst the pieces of the filtered set.

10. The system of claim 6, wherein the selection of the one of the different combinations which minimizes the difference between the width of the fabric substrate and the sum comprises filtering the set to patterns to include only ones of the patterns in the set having a length within a common range of lengths and performing the selection of the one of the different combinations from amongst the patterns of the filtered set.

11. A computing device comprising a non-transitory computer readable storage medium having program instructions stored therein, the instructions being executable by at least one processing core of a processing unit to cause the processing unit to optimally print template components on a fabric substrate by:
   reading from a pool of printable pieces a set of the printable pieces each having a corresponding one of a multiplicity of different patterns for respectively different garments, each of the printable pieces having known dimensions;
   locating on a section of a fabric substrate a starting point from which different ones of the pieces in the set are to be printed;
   computing for each different one of a multiplicity of subsets of the pieces in the set, different combinations of the pieces for which a sum of the known dimensions for the pieces of a corresponding one of the combinations is less than or equal to a constraining dimension of the fabric substrate measured from the starting point;
   selecting one of the different combinations which minimizes a difference between the constraining dimension of the fabric substrate and the sum;
   directing a printer to print the pieces of the selected one of the different combinations onto the fabric substrate;
   removing the pieces of the selected one of the different combinations from the pool;
   repeating the reading, locating, computing, selecting, directing and removing for remaining ones of the printable pieces of the patterns;
   thereafter detecting a printing error in respect to printing of one of the pieces; and,
   responsive to the detection, re-inserting the one of the pieces associated with the printing error into the pool for use in a new permutation of the printable pieces at a later time.

12. The device of claim 11, wherein the set of printable pieces derives from multiple different patterns, each including a defined arrangement of selected ones of the pieces which when combined form a different one of the garments.

13. The device of claim 12, wherein the instructions are additionally executable to direct the printer to print at an edge of each one of the pieces of the selected one of the different combinations, a marker identifying a corresponding one the different garments.

14. The device of claim 11, wherein the selection of the one of the different combinations which minimizes the difference between the constraining dimension of the fabric substrate and the sum comprises filtering the set to pieces associated with a threshold customer priority and performing the selection of the one of the different combinations from amongst the pieces of the filtered set.

15. The device of claim 11, wherein the selection of the one of the different combinations which minimizes the difference between the constraining dimension of the fabric substrate and the sum comprises filtering the set to pieces to include only ones of the pieces in the set having a length within a common range of lengths and performing the selection of the one of the different combinations from amongst the pieces of the filtered set.

* * * * *